3,331,866
PROCESS FOR THE PREPARATION OF
ADIPONITRILE
Ryoichi Wakasa, Kazuo Saotome, and Seiji Miyata, Tokyo,
Japan, assignors to Asahi Kasei Kogyo Kabushiki
Kaisha, Kita-ku, Osaka, Japan, a corporation of Japan
No Drawing. Filed Apr. 12, 1965, Ser. No. 447,509
Claims priority, application Japan, Mar. 9, 1962,
37/8,541
3 Claims. (Cl. 260—465.2)

This application is a continuation-in-part of our application Ser. No. 261,822 filed Feb. 28, 1963 now abandoned.

This invention relates to a process for the preparation of adiponitrile. Adiponitrile is an intermediate for the synthesis of hexamethylene diamine, which is the raw material for synthetic high polymers of the polyamide series. There have been proposed various processes for the synthesis thereof.

The present invention is to provide a novel process for the preparation of adiponitrile from δ-cyanovalerates as the starting material with high yield as well as with industrial advantage.

δ-Cyanovalerate is prepared in a high yield by the reaction of δ-chlorovalerate with an alkali cyanide in an organic polar solvent such as dimethyl formamide.

δ-Chlorovalerate can be readily prepared by hydrolyzing in sulfuric acid 1,1,1,5-tetrachloropentane formed by the telomerization of ethylene and carbon tetrachloride and then esterifying the resultant with an alcohol.

Before going into an explanation of the present process, we will refer, in the first place, to a well-known process for the preparation of adiponitrile by heating and dehydrating a diammonium salt of adipic acid in the presence of a dehydrating catalyst, as we believe it is very helpful to compare it with the present process.

The process for the preparation of adiponitrile from adipic acid has been well known and has been carried out in industry. A large number of studies thereon have been also made. Its reaction mechanism can be illustrated as follows in view of the descriptions in literature [for example, E. N. Zilberman, Zh. Obsch. Khim. 25, 2127 (1955)]:

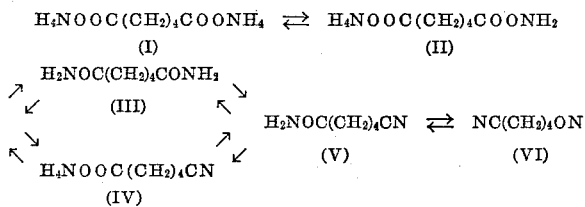

That is to say, it is considered that adiponitrile VI is formed through such intermediates as II, III, IV and V in the steps where two ammonium bases of carboxylic acids present in diammonium adipate (I) are converted into an amide group and a nitrile group by two stage dehydrating reaction. The reaction is carried out by passing adipic acid in a gaseous phase together with ammonia over the dehydrating catalyst layer at a temperature of 300° to 450° C.

An important problem in the reaction for the preparation of adiponitrile from adipic acid is the life of the dehydrating catalyst. Generally, the activity of the catalyst remarkably drops after 30–50 hours, and the yield of adiponitrile decreases. The reason for such an unfavorable yield in the reaction is due to the fact that remarkably large amounts of by-products, such as cyclic imino-compounds and cyclopentanone, are formed. That is, deammonia-cyclization within the molecule of such intermediate compounds as II, III and IV among the intermediates shown in the aforementioned chemical equations results in the said cyclic imino-compound, and decarbonation-cyclization of adipic acid gives rise to the formation of the said cyclopentanone.

The present inventors have made detailed research in detail on the synthesis of adiponitrile from δ-cyanovalerate or δ-cyanovaleric acid as the starting material by the above-mentioned dehydrating reaction and have developed the process of the present invention.

When the process for the synthesis of adiponitrile from δ-cyanovaleric acid or esters thereof is taken into account on the basis of the said knowledge of prior art, it can be thought that the chemical structure and reactivity of δ-cyanovaleric acid and the esters thereof are very similar to those of intermediates in the course of the adiponitrile formation from adipic acid, as stated above, and thus it is inferred that adiponitrile can also be formed by dehydrating said acid or ester as the starting material. According to this concept, we have obtained adiponitrile by reacting δ-cyanovaleric acid with ammonia gas, at a temperature of 300° to 450° C., using boron phosphate, alumina, silica gel and the like as the catalyst, in a higher yield than that in the case of adipic acid. Similar experiments were made also with δ-cyanovalerate ester, but only somewhat less favorable results were obtained than that in the case of adipic acid.

It has been found that when δ-cyanovaleric acid is used, adiponitrile is produced with a favorable result, but there is still the problem in the synthesis of the said compound. In other words, even by carrying out direct cyanation of δ-chlorovaleric acid, only δ-valerolactone is formed, and δ-cyanovaleric acid cannot be obtained. On the other hand, by carrying out cyanation of δ-chlorovalerate, δ-cyanovalerate esters can be obtained in a high yield. By carrying out partial hydrolysis of δ-cyanovalerates, δ-cyanovaleric acid is formed, but, at the same time, part of the cyano group undergoes the hydrolysis and, accordingly, the yield is not improved. In this way, it has been found that there is a difficult problem in the process where δ-cyanovaleric acid is employed.

As a result of various detailed studies on the means for the synthesis of adiponitrile from δ-cyanovalerate, the following remarkable fact has been found. That is, when δ-cyanovalerates undergo ammonolysis using ammonia, δ-cyanovaleramide is formed in a stoichiometric yield. Further, it has been found that, by carrying out the dehydrating reaction of said δ-cyanovaleramide using the above-mentioned dehydrating catalyst, adiponitrile can be formed in a remarkably high yield and with industrial advantage without any lowering of catalyst activity even after a long period of time.

Now, an explanation will be made hereunder with regard to an embodiment of the present invention. Usually, relatively lower esters such as the methyl, ethyl, and propyl esters are used as the δ-cyanovalerate. On leaving the said ester in a methanol solution saturated with ammonia at room temperature for 4 to 5 days, δ-cyanovaleramide is formed in a stoichiometric yield. Further, on treating the said ester with an excess of liquid ammonia at higher than 100° C., the said amide can be obtained in such a short period of time as 1 to 2 hours. Ammonia gas is blown into the δ-cyanovaleramide thus prepared in a preheating zone to vaporize it, and the reaction is carried out by passing the vaporized product and ammonia over a dehydrating catalyst layer kept at a temperature of 300° to 450° C. In this case, boron phosphate, alumina, silica gel and the like are employed as the dehydrating catalyst. In case the raw material is fed at such a rate that the contact time may become 5 to 20 seconds, a good result can be obtained. The product is condensed in a cooling zone, whereby crude adiponitrile is obtained. This crude adiponitrile is further distilled for purification. The presence of ammonia, though not essential in the present reaction, promotes the vaporization of δ-cyanovaleramide and is effective for an increase of the yield.

EXAMPLE 1

This example illustrates the present process in comparison with the cases where adipic acid and δ-cyanovaleric acid are employed.

To 70 parts (by weight, and the same is applied hereunder) of ethyl δ-cyanovalerate in an autoclave were added 100 parts of methanol and 60 parts of liquid ammonia, and the mixture was subjected to reaction at 80° C. for 10 hours. From the product mixture, 56 parts of δ-cyanovaleramide were obtained (yield: 97%, melting point: 62° C.). Employed as the catalyst was boron phosphate, which had been prepared by adding 37 parts of boric acid to 76 parts of 85% phosphoric acid, heating the resulting mixture at 110° C. for 18 hours, and further heating it at 350° C. for 4 hours. To investigate the hourly change of catalyst activity, adipic acid, δ-cyanovaleric acid and the said δ-cyanovaleramide underwent the reaction respectively under the same condition for comparison.

The reaction was carried out in such a way that 50 ml. of catalyst was packed in a quartz tube and kept at 350° C., and the said raw materials, together with ammonia gas (7 times in equivalent) were respectively vaporized in the preheating zone (heated to about 400° C.) and subjected to reaction by passing the gaseous mixture through the catalyst layer under a condition of space velocity 100. The yields of adiponitrile at the beginning of the reaction and after 30 hours' reaction obtained for respective raw materials are shown in the following table.

| (Raw Material) | Yield at Initial Stage (percent) | Yield after 30 hours (percent) |
|---|---|---|
| Adipic acid | 82 | 65 |
| δ-cyanovaleric acid | 90 | 78 |
| δ-cyanovaleramide | 93 | 86 |

As is clear from the above table, remarkably better yield and longer life of catalyst were obtained when δ-cyanovaleramide was employed than in the others.

EXAMPLE 2

The reaction was carried out by passing 56 parts of δ-cyanovaleramide through a quartz tube packed with 50 ml. of 10 to 20 mesh silica gel. The mode of reaction was the same as that in Example 1. The reaction temperature was 350° C. and the space velocity was 100. By this reaction, 38.5 parts of adiponitrile were obtained. The yield was 90%.

EXAMPLE 3

The reaction was carried out by passing 50 parts of δ-cyanovaleramide through a quartz tube packed with 50 ml. of about 10 mesh granular alumina. The mode of reaction was the same as that in Example 1. The reaction temperature was 350° C. and the space velocity was 100. By this reaction 39 parts of adiponitrile were obtained. Yield was 91%.

EXAMPLE 4

The same procedure as in Example 3 were repeated except that nitrogen gas of the same volume was employed instead of ammonia gas. As the result, 35 parts of adiponitrile were obtained from 50 parts of δ-cyanovaleramide. The yield was 82%.

What is claimed is:

1. A process for preparing adiponitrile consisting essentially of the steps of reacting a δ-cyanovalerate with ammonia in the presence of methanol at 80° C. for 10 hours to yield δ-cyanovaleramide, said δ-cyanovalerate being an ester formed from an alkanol having 1 to 3 carbon atoms, and passing the resulting δ-cyanovaleramide in the gas phase over a dehydrating catalyst heated at a temperature between 300° C. and 450° C., said dehydrating catalyst being boron phosphate, alumina or silica gel.

2. A process according to claim 1, wherein said δ-cyanovaleramide is passed in the gas phase over a dehydrating catalyst heated at a temperature between 300° C. and 450° C. in the presence of ammonia.

3. A process as claimed in claim 1 wherein said esters of δ-cyanovalerate are the methyl, ethyl or propyl esters.

References Cited

UNITED STATES PATENTS 3,117,155  1/1964  Chapman _____ 260—465.2

OTHER REFERENCES

Haga et al., C.A., 50, 1956, p. 8716.
Zoroastrova et al., C.A., 40, 1946, pp. 3402–3403.

JOSEPH P. BRUST, *Primary Examiner.*

CHARLES B. PARKER, *Examiner.*